United States Patent
Ionescu

(10) Patent No.: US 7,788,274 B1
(45) Date of Patent: Aug. 31, 2010

(54) SYSTEMS AND METHODS FOR CATEGORY-BASED SEARCH

(75) Inventor: Mihai Florin Ionescu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 941 days.

(21) Appl. No.: 10/881,665

(22) Filed: Jun. 30, 2004

(51) Int. Cl.
  *G06F 17/30* (2006.01)
(52) U.S. Cl. ...................................... 707/763
(58) Field of Classification Search .................. 707/763
  See application file for complete search history.

(56) References Cited

U.S. PATENT DOCUMENTS

| | | | |
|---|---|---|---|
| 5,418,948 A | | 5/1995 | Turtle |
| 5,678,038 A | * | 10/1997 | Dockter et al. ................. 707/1 |
| 5,696,962 A | | 12/1997 | Kupiec |
| 5,701,469 A | | 12/1997 | Brandli et al. |
| 5,717,913 A | * | 2/1998 | Driscoll ......................... 707/5 |
| 5,754,938 A | * | 5/1998 | Herz et al. .................. 725/116 |
| 5,796,393 A | * | 8/1998 | MacNaughton et al. ..... 715/733 |
| 5,826,261 A | | 10/1998 | Spencer |
| 5,890,152 A | | 3/1999 | Rapaport et al. |
| 5,911,139 A | * | 6/1999 | Jain et al. ....................... 707/3 |
| 5,933,827 A | * | 8/1999 | Cole et al. .................... 707/10 |
| 5,940,821 A | | 8/1999 | Wical |
| 5,964,839 A | * | 10/1999 | Johnson et al. ............ 709/224 |
| 5,987,446 A | | 11/1999 | Corey et al. |
| 6,006,222 A | | 12/1999 | Culliss |
| 6,012,067 A | * | 1/2000 | Sarkar .................... 707/103 R |
| 6,014,665 A | | 1/2000 | Culliss |
| 6,070,158 A | | 5/2000 | Kirsch et al. |
| RE36,727 E | | 6/2000 | Kageneck et al. |
| 6,078,916 A | | 6/2000 | Culliss |
| 6,112,203 A | | 8/2000 | Bharat et al. |
| 6,122,647 A | | 9/2000 | Horowitz et al. |
| 6,167,434 A | | 12/2000 | Pand |
| 6,182,068 B1 | | 1/2001 | Culliss |
| 6,199,059 B1 | * | 3/2001 | Dahan et al. ................... 707/3 |
| 6,272,507 B1 | | 8/2001 | Pirolli et al. |
| 6,321,228 B1 | | 11/2001 | Crandall et al. |
| 6,397,221 B1 | * | 5/2002 | Greef et al. ................. 707/102 |

(Continued)

OTHER PUBLICATIONS

Li, W. and Clifton, C. 1994. Semantic Integration in Heterogeneous Databases Using Neural Networks. In Proceedings of the 20th international Conference on Very Large Data Bases (Sep. 12-15, 1994). J. B. Bocca, M. Jarke, and C. Zaniolo, Eds. Very Large Data Bases. Morgan Kaufmann Publishers, San Francisco, CA, 1-12.*

(Continued)

*Primary Examiner*—Neveen Abel Jalil
*Assistant Examiner*—Mark Andrew X Radtke
(74) *Attorney, Agent, or Firm*—Fenwick & West LLP

(57) ABSTRACT

Systems and methods for category-based search are described. In one described system, a computer program identifies an article having an attribute, determines a category associated with the article based at least in part on the article attribute, and stores in a data store a data record comprising a category-article pair identifier associated with the category and the article. A search query is received and executed on a data store comprising the association data record. In response, the association data record is received from the data store. Search results may be constructed and displayed using the association data record.

43 Claims, 5 Drawing Sheets

U.S. PATENT DOCUMENTS

| | | | |
|---|---|---|---|
| 6,421,675 B1 | 7/2002 | Ryan et al. | |
| 6,460,036 B1 | 10/2002 | Herz | |
| 6,473,752 B1 | 10/2002 | Fleming | |
| 6,484,164 B1* | 11/2002 | Nikolovska et al. | 707/3 |
| 6,490,575 B1 | 12/2002 | Berstis | |
| 6,505,191 B1 | 1/2003 | Baclawski | |
| 6,546,388 B1 | 4/2003 | Edlund et al. | |
| 6,571,234 B1 | 5/2003 | Knight et al. | |
| 6,581,056 B1 | 6/2003 | Rao | |
| 6,583,798 B1* | 6/2003 | Hoek et al. | 715/822 |
| 6,587,856 B1* | 7/2003 | Srinivasan et al. | 707/102 |
| 6,602,300 B2 | 8/2003 | Ushioda et al. | |
| 6,633,868 B1 | 10/2003 | Min et al. | |
| 6,665,666 B1 | 12/2003 | Brown et al. | |
| 6,687,704 B1* | 2/2004 | Russell | 707/100 |
| 6,697,799 B1* | 2/2004 | Neal et al. | 707/3 |
| 6,697,840 B1* | 2/2004 | Godefroid et al. | 709/205 |
| 6,745,178 B1 | 6/2004 | Emens et al. | |
| 6,772,188 B1 | 8/2004 | Cloutier | |
| 6,778,951 B1 | 8/2004 | Contractor | |
| 6,785,671 B1 | 8/2004 | Bailey et al. | |
| 6,795,825 B2* | 9/2004 | Rishe | 707/10 |
| 6,803,906 B1 | 10/2004 | Morrison et al. | |
| 6,820,093 B2* | 11/2004 | de la Huerga | 707/104.1 |
| 6,820,237 B1 | 11/2004 | Abu-Hakima et al. | |
| 6,834,287 B1* | 12/2004 | Folk-Williams et al. | 707/103 Z |
| 6,850,934 B2 | 2/2005 | Bates et al. | |
| 6,853,998 B2 | 2/2005 | Biebesheimer et al. | |
| 6,874,126 B1* | 3/2005 | Lapidous | 715/711 |
| 6,925,456 B2 | 8/2005 | Nakano et al. | |
| 6,948,134 B2* | 9/2005 | Gauthier et al. | 715/804 |
| 6,950,791 B1* | 9/2005 | Bray et al. | 703/22 |
| 6,961,910 B2* | 11/2005 | Lee et al. | 715/853 |
| 6,961,954 B1 | 11/2005 | Maybury et al. | |
| 6,963,830 B1 | 11/2005 | Nakao | |
| 6,976,053 B1 | 12/2005 | Tripp et al. | |
| 6,976,090 B2* | 12/2005 | Ben-Shaul et al. | 709/246 |
| 7,007,085 B1 | 2/2006 | Malik | |
| 7,022,905 B1* | 4/2006 | Hinman et al. | 84/609 |
| 7,027,975 B1* | 4/2006 | Pazandak et al. | 704/9 |
| 7,032,174 B2* | 4/2006 | Montero et al. | 715/257 |
| 7,039,650 B2 | 5/2006 | Adams et al. | |
| 7,043,492 B1* | 5/2006 | Neal et al. | 707/101 |
| 7,054,860 B2 | 5/2006 | Inaba et al. | |
| 7,054,870 B2* | 5/2006 | Holbrook | 707/10 |
| 7,062,442 B2 | 6/2006 | Berg et al. | |
| 7,082,428 B1 | 7/2006 | Denny et al. | |
| 7,099,860 B1 | 8/2006 | Liu et al. | |
| 7,146,399 B2* | 12/2006 | Fox et al. | 709/203 |
| 7,162,473 B2 | 1/2007 | Dumais | |
| 7,171,352 B2* | 1/2007 | Chang et al. | 704/9 |
| 7,181,459 B2 | 2/2007 | Grant et al. | |
| 7,194,455 B2 | 3/2007 | Zhou et al. | |
| 7,194,485 B2* | 3/2007 | Kaipa et al. | 707/104.1 |
| 7,231,395 B2 | 6/2007 | Fain et al. | |
| 7,293,014 B2 | 11/2007 | Subramaniam et al. | |
| 7,293,015 B2 | 11/2007 | Zhou | |
| 7,318,049 B2* | 1/2008 | Iannacci | 705/39 |
| 7,412,708 B1* | 8/2008 | Khan et al. | 719/318 |
| 7,421,645 B2* | 9/2008 | Reynar | 715/206 |
| 7,437,353 B2* | 10/2008 | Marmaros et al. | 707/3 |
| 7,451,136 B2 | 11/2008 | Chua et al. | |
| 7,478,089 B2 | 1/2009 | Henkin et al. | |
| 2001/0037328 A1 | 11/2001 | Pustejovsky et al. | |
| 2001/0037377 A1 | 11/2001 | Nakano et al. | |
| 2002/0016786 A1 | 2/2002 | Pitkow et al. | |
| 2002/0040311 A1 | 4/2002 | Douglass et al. | |
| 2002/0059272 A1 | 5/2002 | Porter | |
| 2002/0065800 A1 | 5/2002 | Morlitz | |
| 2002/0069194 A1 | 6/2002 | Robbins | |
| 2002/0095427 A1 | 7/2002 | Kaplan | |
| 2002/0099700 A1 | 7/2002 | Li | |
| 2002/0103698 A1 | 8/2002 | Cantrell | |
| 2002/0103737 A1* | 8/2002 | Briere | 705/36 |
| 2002/0103806 A1 | 8/2002 | Yamanoue | |
| 2002/0116291 A1 | 8/2002 | Grasso et al. | |
| 2002/0129059 A1* | 9/2002 | Eck | 707/513 |
| 2002/0174101 A1 | 11/2002 | Fernley et al. | |
| 2003/0014398 A1 | 1/2003 | Ohta | |
| 2003/0020749 A1 | 1/2003 | Abu-Hakima et al. | |
| 2003/0033296 A1 | 2/2003 | Rothmuller et al. | |
| 2003/0046311 A1 | 3/2003 | Baidya et al. | |
| 2003/0055831 A1 | 3/2003 | Ryan et al. | |
| 2003/0069877 A1 | 4/2003 | Grefenstette et al. | |
| 2003/0079185 A1 | 4/2003 | Katariya et al. | |
| 2003/0093276 A1 | 5/2003 | Miller et al. | |
| 2003/0093790 A1 | 5/2003 | Logan et al. | |
| 2003/0115552 A1 | 6/2003 | Jahnke et al. | |
| 2003/0123443 A1 | 7/2003 | Anwar | |
| 2003/0130982 A1 | 7/2003 | Kasriel et al. | |
| 2003/0135490 A1 | 7/2003 | Barrett et al. | |
| 2003/0135499 A1 | 7/2003 | Schirmer et al. | |
| 2003/0154071 A1 | 8/2003 | Shreve | |
| 2003/0158855 A1 | 8/2003 | Farnham et al. | |
| 2003/0167266 A1 | 9/2003 | Saldanha et al. | |
| 2003/0208493 A1 | 11/2003 | Hall et al. | |
| 2003/0220913 A1 | 11/2003 | Doganata et al. | |
| 2004/0001104 A1 | 1/2004 | Sommerer et al. | |
| 2004/0003097 A1 | 1/2004 | Willis et al. | |
| 2004/0030741 A1 | 2/2004 | Wolton et al. | |
| 2004/0036716 A1 | 2/2004 | Jordahl | |
| 2004/0059564 A1 | 3/2004 | Zhou | |
| 2004/0064447 A1 | 4/2004 | Simske et al. | |
| 2004/0068486 A1 | 4/2004 | Chilovskii | |
| 2004/0073534 A1 | 4/2004 | Robson | |
| 2004/0122656 A1 | 6/2004 | Abir | |
| 2004/0133560 A1 | 7/2004 | Simske | |
| 2004/0139106 A1 | 7/2004 | Bachman et al. | |
| 2004/0143569 A1 | 7/2004 | Gross et al. | |
| 2004/0181749 A1* | 9/2004 | Chellapilla et al. | 715/505 |
| 2004/0225667 A1 | 11/2004 | Hu et al. | |
| 2004/0267700 A1 | 12/2004 | Dumais et al. | |
| 2004/0267730 A1 | 12/2004 | Dumais et al. | |
| 2004/0267813 A1 | 12/2004 | Rivers-Moore et al. | |
| 2005/0065909 A1 | 3/2005 | Musgrove et al. | |
| 2005/0114306 A1 | 5/2005 | Shu et al. | |
| 2005/0125382 A1 | 6/2005 | Karnawat et al. | |
| 2005/0125390 A1 | 6/2005 | Hurst-Hiller et al. | |
| 2005/0187920 A1 | 8/2005 | Tenembaum et al. | |
| 2005/0198026 A1 | 9/2005 | Dehlinger et al. | |
| 2005/0222987 A1 | 10/2005 | Vadon | |
| 2005/0262073 A1 | 11/2005 | Reed | |
| 2006/0010150 A1 | 1/2006 | Shaath et al. | |
| 2006/0136405 A1 | 6/2006 | Ducatel et al. | |

OTHER PUBLICATIONS

Li, W. and Clifton, C. 2000. SEMINT: a tool for identifying attribute correspondences in heterogeneous databases using neural networks. Data Knowl. Eng. 33, 1 (Apr. 2000), 49-84. DOI= http://dx.doi.org/10.1016/S0169-023X(99)00044-0.*

Berlin, J. and Motro, A. 2002. Database Schema Matching Using Machine Learning with Feature Selection. CAISE 2002, LNCS 2348, pp. 452-466, 2002. http://www.springerlink.com/content/73u6cpt0qek8rgh0/.*

Scha, R. and Polanyi, L. 1988. An augmented context free grammar for discourse. In Proceedings of the 12th Conference on Computational Linguistics—vol. 2 (Budapest, Hungry, Aug. 22-27, 1988). D. Vargha, Ed. International Conference on Computational Linguistics. Morristown, NJ, 573-577. DOI= http://dx.doi.org/10.3115/991719.991756.*

Garofalakis, M., Gionis, A., Rastogi, R., Seshadri, S., and Shim, K. 2000. XTRACT: a system for extracting document type descriptors from XML documents. SIGMOD Rec. 29, 2 (Jun. 2000), 165-176.*

U.S. Appl. No. 10/749,440, filed Dec. 31, 2003, Badros et al.
80-20 Software—Products—80-20 One Search, http://www.80-20.com/products/one-search/retriever.asp, printed Mar. 16, 2004.
"askSam™ Making Information Useful," askSam,—Organize your information with askSam, http://www.asksam.com/brochure.asp, printed Mar. 15, 2004.
Alexa® Web Search—Toolbar Quick Tour, http://pages.alexa.com/prod_serv/quicktour.html, pp. 1-5, printed Mar. 16, 2004.
Barrett, R. et al., "How to Personalize the Web," IBM Research, http://www.almaden.ibm.com/cs/wbi/papers/chi97/wbipaper.html, pp. 1-13, printed Mar. 16, 2004.
Battelle, J., CNN.com "When geeks go camping, ideas hatch," http://www.cnn.com/2004/TECH/ptech/01/09/bus2.feat.geek.camp/index.html, pp. 1-3, printed Jan. 13, 2004.
Boyan, J., et al., "A Machine Learning Architecture for Optimizing Web Search Engines," School of Computer Science, Carnegie Mellon University, May 10, 1996, pp. 1-8.
Bradenbaugh, F., "Chapter 1 The Client-Side Search Engine," *JavaScript Cookbook*, 1$^{st}$ Ed., Oct. 1999, O'Reilly™ Online Catalog, http://www.oreilly.com/catalog/jscook/chapter/ch01.html, pp. 1-30, printed Dec. 29, 2003.
Brin, S., et al, "The Anatomy of a Large-Scale Hypertextual Web Search Engine," http://vww7.scu.edu/programme/fullpapers/1921/com1921.htm, pp. 1-18, 1998.
Budzik, J., et al., User Interactions with Everyday Applications as Context for Just-in-time Information Access, Intelligent Information Laboratory, Northwestern University, pp. 1-8, no date.
DEVONthink, http://www.devon-techonologies.com/products/devonthink.php, printed Mar. 16, 2004.
dtSearch®—http://www.dtsearch.com/, printed Mar. 15, 2004.
Dumais, S., et al, "Stuff I've Seen: A System for Personal Information Retrieval and Re-Use," Microsoft Research, *SIGIR'03*, Jul. 28-Aug. 1, 2003, pp. 1-8.
Enfish, http://www.enfish.com, printed Mar. 16, 2004.
Fast Search & Transfer—Home—Enterprise Search, http://solutions.altavista.com/en/news/pr_020402_desktop.shtmu, printed Mar. 16, 2004.
Fertig, S., et al., "Lifestreams: An Alternative to the Desktop Metaphor," http://www.acm.org/sigchi/chi96/proceedings/videos/Fertig/etf.htm, pp. 1-3, printed Mar. 16, 2004.
Geisler, G., "Enriched Links: A Framework for Improving Web Navigation Using Pop-Up Views," pp. 1-14, 2000.
ISYS Search Software—ISYS: desktop, http://www.isysusa.com/products/desktop/index.html, printed Mar. 16, 2004.
Joachims, T., et al., "WebWatcher. A Tour Guide for the World Wide Web," 1996.
Markoff, J., "Google Moves Toward Clash with Microsoft," *The New York Times*, May 19, 2004, http://www.nytimes.com/2004/5/19/technology/19google.html?ex=1085964389&ei=1&e... pp. 1-4, printed May 19, 2004.
Naraine, R., "Future of Search Will Make You Dizzy," Enterprise, May 20, 2004. http://www.internetnews.com/ent-news/article.php/3356831, pp. 1-4, printed May 21, 2004.
"Overview," Stuff I've Seen—Home Page, http://research.Microsoft.com/adapt/sis/index.htm, pp. 1-2, printed May 26, 2004.
Rhodes, B., "Margin Notes Building a Contextually Aware Associative Memory," *The Proceedings of the International Conference on Intelligent User Interfaces (IUI'00)*, Jan. 9-12, 2000.
Rhodes, B., et al., "Just-in-time information retrieval agents," *Systems Journal*, vol. 39, Nos. 3&4, 2000, pp. 685-704.
Rhodes, B., et al., "Remembrance Agent—A continuously running automated information retrieval system," *The Proceedings of the First International Conference on the Practical Application of Intelligent Agents and Multi Agent Technology* (PAAM '96), pp. 487-495.
Rizzo, T., "WinFS 101: Introducing the New Windows File System," Longhorn Developer Center Home: Headline Archive: WinFS 101: Introducing the New . . . http://msdn.Microsoft.com/Longhorn/archive/default.aspx?pull+/library/en-us/dnwinfs/htm..., pp. 1-5, printed Apr. 21, 2004.

"Searching for the next Google—New trends are helping nimble startups elbow in to the plundered market," Red Herring—The Business of Technology, Mar. 9, 2004, http://redherring.com/PrintArticle.aspx?a=4782&sector=Capital, pp. 1-5, printed Mar. 30, 2004.
"Selecting Task-Relevant Sources for Just-In-Time Retrieval," pp. 1-3, no date.
Sherman, C., "HotBot's New Desktop Search Toolbar," www.searchenginewatch.com, http://searchenginewatch.com/searchday/print.php/34711_339921, pp. 1-3, printed Apr. 14, 2004.
"Standardization Priorities for the Directory—Directory Interoperability Forum White Paper," The Open Group, Dec. 2001, pp. 1-21.
Sullivan, D., "Alta Vista Releases Search Software," *The Search Engine Report*, Aug. 4, 1998, pp. 1-2.
WebWatcher Home Page, "Welcome to the WebWatcher Project," http://www-2.cs.cmu.edu/~webwatcher/, printed Oct. 15, 2003.
"WhenU Just-In-Time Marketing," http://www.whenu.com, printed Mar. 19, 2004.
X1 instantly searches files & email. For outlook, Outlook, http://www.x1.com/, printed Mar. 15, 2004.
Zellweger, P., et al., "Fluid Links for Informed and Incremental Link Transitions," Proceedings of Hypertext'98, Pittsburgh, PA, Jun. 20-24, 1998, pp. 50-57.
Brill, E., "A Simple Rule-Based Part of Speech Tagger," Department of Computer Science, University of Pennsylvania, 1992, pp. 1-5.
Claypool, M., et al., "Inferring User Interest," IEEE Internet Computing, 2001, pp. 1-17, vol. 5, No. 6, located at http://web.cs.wpi.edu/~claypool/papers/iui/iui.pdf.
Czerwinski, M., et al., "Visualizing Implicit Queries for Information Management and Retrieval," ACM CHI 99, May 15-20, 1999, pp. 560-567.
Knezevic, P. et al., "The Architecture of the Obelix—An Improved Internet Search Engine," Proceedings of the 33$^{rd}$ Annual Hawaii International Conference on System Sciences (HICSS) Jan. 4-7, 2000, Maui, HI, USA, pp. 2145-2155.
Morita, M. et al., "Information Filtering Based on User Behavior Analysis and Best Match Text Retrieval," Proceedings of the Annual International ACM-SIGIR Conference on Research and Development in Information Retrieval, Dublin, Jul. 3-6, 1994, pp. 272-281.
Phelps, A., "All You Can Seek," Special Services, Jul. 1999, vol. 7, Iss. 7, [online] [Retrieved on Oct. 16, 2006] Retrieved from the Internet: http://www.smartcomputing.com/editorial/article.asp?article=articles/archive/g0707/26g07/26g07.asp.
International Search Report and Written Opinion, PCT/US2004/038562, Apr. 6, 2005, 12 pages.
Czerwinski, M., et al., "Visualizing Implicit Queries For Information Management and Retrieval," CHI 99, May 15-20, 1999, ACM, pp. 560-567.
Garofalakis, M., et al., "XTRACT: A System for Extracting Document Type Descriptors from XML Documents," SIGMOD, ACM, Jun. 2000, p. 165-176, vol. 29, No. 2.
Horvitz, E., et al., "The Lumiere project: Bayesian user modeling for inferring the goals and needs of software users", Proceedings of the Fourteenth Conference on Uncertainty, 1998, pp. 256-265, Morgan Kaufmann: San Francisco.
Joho, H., et al., "A Study of User Interaction with a Concept-Based Interactive Query Expansion Support Tool," Advances in Information Retrieval, A Study of User Interaction, Lecture Notes in Computer Science, Mar. 2, 2004, pp. 42-56, vol. 2997.
Jones, G., et al., "Context-Aware Retrieval for Ubiquitous Computing Environments," Mobile and Ubiquitous Information Access, Lecture Notes in Computer Science, Jan. 27, 2004, pp. 227-243, vol. 2954.
Shedherd, M., et al., "Browsing and Keyword-Based Profiles: A Cautionary Tale," Proceedings of the 34$^{th}$ Hawaii International Conference on System Sciences, Jan. 3-6, 2001, pp. 1365-1373.
White, R., et al., "The Use of Implicit Evidence for Relevance Feedback in Web Retrieval," Lecture Notes in Computer Science, Jan. 1, 2002, pp. 93-109, vol. 2291.

* cited by examiner

SYSTEMS AND METHODS FOR CATEGORY-BASED SEARCH

RELATED APPLICATION

This application relates to Ser. No. 10/882,049, filed herewith, titled "Systems and Methods for Natural Language Search," the entirety of which is incorporated herein by reference.

FIELD OF THE INVENTION

The present invention relates generally to systems and methods for information retrieval. The present invention relates particularly to systems and methods for category-based search.

BACKGROUND

Conventional search engines receive a search query from a user and execute a search against a global index. Such conventional search engines typically use one or more conventional methods for performing a search. For example, one known method, described in an article entitled "The Anatomy of a Large-Scale Hypertextual Search Engine," by Sergey Brin and Lawrence Page, assigns a degree of importance to a document, such as a web page, based on the link structure of the web. The search results are often presented in a list format, including article identifiers and brief snippets about the documents in a web page that can be resized.

A user may also have access to other information stored on the user's local machine or on other storage media accessible via a network. Typically, when searching for information using conventional means, a user enters an explicit search query that comprises keywords and the query is executed against either a global or a local index. The query may also be generated as an implicit query. The information found is output to the user as a result set.

Some conventional search systems allow a user to search by categories. For example, the Google™ search engine allows a user to search using categories by selecting the "Directory" (Google Inc., Mountain View, Calif.; www.google.com). The Yahoo!® search engine allows a user to search by categories, either by selecting a category or by entering an explicit query and being presented with one or more categories in the result set (Yahoo! Inc., Sunnyvale, Calif.; www.yahoo.com). The categories utilized by both of these search engines are static and are edited manually.

Other conventional systems provide simplistic categorization. For example, conventional e-mail systems provide the user with the capability of defining message-handling rules. A rule may specify, for example, that any incoming mail message with "News" in the subject be refiled to a news subfolder within the user's inbox. Such rules are typically defined manually by the user or by an e-mail administrator.

SUMMARY

Embodiments of the present invention provide systems and methods for category-based search. In one embodiment of the present invention, a computer program identifies an article having an attribute, determines a category associated with the article based at least in part on the article attribute, and stores in a data store a data record comprising a category-article pair identifier associated with the category and the article. A search query may be received and executed on a data store comprising the association data record. In response, the association data record is received from the data store. In another embodiment, a computer-readable medium (such as, for example random access memory or a computer disk) comprises code for carrying out such a method.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide systems and methods for determining a category for an article and optionally for category-based search. Exemplary embodiments are described below.

System Architecture

Figure 1:
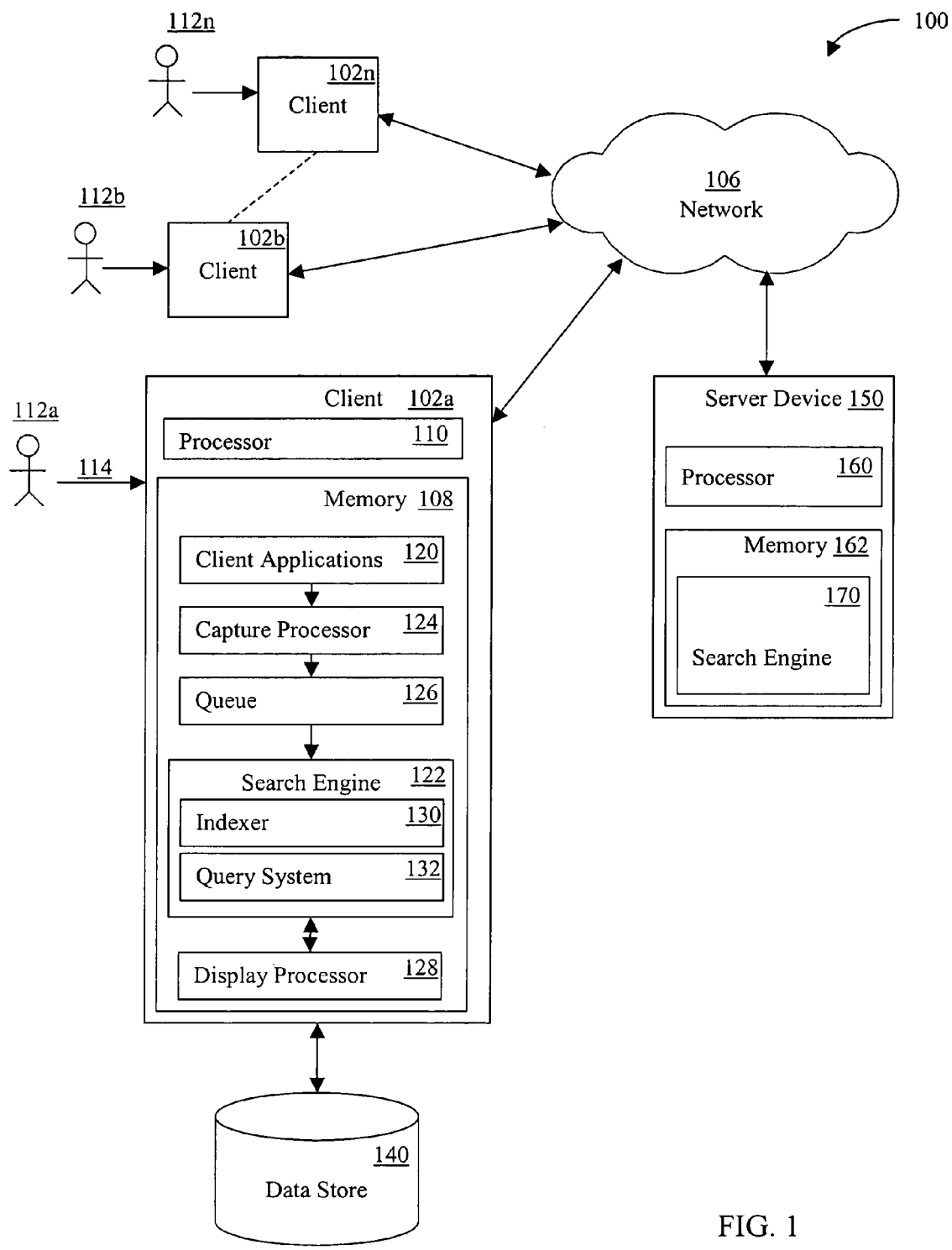
FIG. 1 is a block diagram illustrating an exemplary environment in which one embodiment of the present invention may operate.

Referring now to the drawings in which like numerals indicate like elements throughout the several figures, FIG. 1 is a block diagram illustrating an exemplary environment for implementation of an embodiment of the present invention. While the environment shown reflects a client-side search engine architecture embodiment, other embodiments are possible.

The system 100 shown in FIG. 1 comprises multiple client devices 102a-n in communication with a server device 150 over a wired or wireless network 106. The network 106 shown comprises the Internet. In other embodiments, other networks, such as an intranet, may be used. Moreover, methods according to the present invention may operate within a single client device.

The client devices 102a-n shown each comprises a computer-readable medium 108. The embodiment shown comprises a random access memory (RAM) 108 coupled to a processor 110. The processor 110 executes computer-executable program instructions stored in memory 108. Such processors may comprise a microprocessor, an ASIC, a state machine, or other processor, and can be any of a number of computer processors, such as processors from Intel Corporation of Santa Clara, Calif. and Motorola Corporation of Schaumburg, Ill. Such processors comprise, or may be in communication with, media, for example computer-readable media, which stores instructions that, when executed by the processor, cause the processor to perform the steps described herein.

Embodiments of computer-readable media comprise, but are not limited to, an electronic, optical, magnetic, or other storage or transmission device capable of providing a processor, such as the processor 110 of client 102a, with computer-readable instructions. Other examples of suitable media comprise, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n can be connected to a network 106 as shown, or can be stand-alone machines. Client devices 102a-n may also comprise a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any operating system, such as Microsoft® Windows® or Linux, capable of supporting one or more client application programs. For example, the client device 102a shown comprises a personal computer executing client application programs, also known as client applications 120. The client applications 120 can be contained in memory 108 and can comprise, for example, a word processing application, a spreadsheet application, an e-mail application, a media player application, an instant messenger application, a presentation application, an Internet browser application, a calendar/organizer application, and any other application or computer program capable of being executed by a client device.

The user 112a can interact with the various client applications 120 and articles associated with the client applications 120 via various input and output devices of the client device 102a. Articles comprise, for example, word processor, spreadsheet, presentation, e-mail, instant messenger, database, and other client application program content files or groups of files, web pages of various formats, such as HTML, XML, eXtensible Hyptertext Markup Language (XHTML), Portable Document Format (PDF) files, and audio files, video files, or any other documents or groups of documents or information of any type whatsoever.

The memory 108 of the client device 102a shown in FIG. 1 also contains a capture processor 124, a queue 126, and a search engine 122. The client device 102a shown also contains or is in communication with a data store 140. The search engine 122 can receive an explicit query from the user 112a or generate an implicit query and retrieve information from the data store 140 in response to the query.

The search engine 122 shown contains an indexer 130, a query system 132, and a formatter (not shown). Events, real-time and historical, contextual and indexable, and performance data can be sent by the queue 126 to the query system 132 to provide the query system 132 with information concerning current user context. The query system 132 can use this information to generate an implicit query. The query system 132 can also receive and process explicit queries from the user 112a.

The data store 140 can be any type of computer-readable media and can be integrated with the client device 102a, such as a hard drive, or external to the client device 102a, such as an external hard drive or on another data storage device accessed through the network 106. The data store 140 may comprise any one or combination of methods for storing data, including without limitation, arrays, hash tables, lists, and pairs.

In the embodiment shown in FIG. 1, a user 112a can input an explicit query into a search engine interface displayed on the client device 102a, which is received by the search engine 122. The search engine 122 can also generate an implicit query based on a current user context or state, which can be determined by the query system 132 from contextual real time events or other means. Based on the query, the query system 132 can locate relevant information in the data store 140 or other index and provide a result set. In one embodiment, the result set comprises article identifiers identifying articles associated with the client applications 120 or client articles. Client articles stored in the data store 140 comprise articles associated with the user 112a or client device 102a, such as the word processing documents, previously viewed web pages and any other article associated with the client device 102a or user 112a. In another embodiment, the result set also comprises identifiers identifying articles located on the network 106 or network articles located by a search engine on a server device. Network articles comprise articles located on the network 106 not previously viewed or otherwise referenced by the user 112a, such as web pages not previously viewed by the user 112a.

The result sets comprise one or more article identifiers. An article identifier may be, for example, a Uniform Resource Locator (URL), a file name, a link, an icon, a path for a local file, an index in a database, or any other suitable article identifier. In the embodiment shown, an article identifier comprises a URL associated with an article.

Messaging articles stored in the data store 140 comprise user's emails, chat messages, instant messaging messages, and other types of electronic messages. Each time a message is received, sent, modified, printed, or otherwise accessed, a record is stored in the data store 140. This information can later be searched to identify messages that should be displayed in the user interface.

The data store 140 comprises a local index. The local index in the embodiment shown in FIG. 1 may comprise information, such as articles, which are associated with the client device 102a, a user 112a of the client device 102a, or a group of users of the client device 102a. For example, the local index in the data store 140 shown in FIG. 1 may comprise an index of articles created, edited, received, or stored by the client user 112a using the client machine 102a, or articles otherwise associated with the client user 102a or the client machine 112a. The local index may be stored in a client machine, such as in data store 140, in a data store on a local network in a manner accessible by the client machine, on a server accessible to the client machine through the Internet, or in another accessible location.

In contrast, a global index may comprise information relevant to many users or many servers, such as, for example, an index of web pages located on multiple servers in communication with the World Wide Web. One example of a global index is an index used by the Google™ search engine to provide search results in response to a search query.

A single index may comprise both a local and a global index. For example, in one embodiment, an index may comprise both local and global information, and include a user or client identifier with the local information so that it may be identified with the user(s) or client(s) to which it pertains. Moreover, an index, local or global, may be present in one or multiple logical or physical locations.

An embodiment of the present invention may also store message threads in the data store 140. In such an embodiment, messages are related together by various attributes, including, for example, the sender, recipient, date/time sent and received, the subject, the content, or any other attribute of the message. The related messages can then be retrieved as a thread, which may be treated as a document by the display processor 128.

The formatter can receive the search result set from the query system 132 of the search engine 122 and can format the results for output to a display processor 128. In one embodiment, the formatter formats the results in eXtensible Markup Language (XML) or Hypertext Markup Language (HTML). The display processor 128 can be contained in memory 108 and can control the display of the result set on a display device associated with the client device 102a. The display processor 128 may comprise various components. For example, in one embodiment, the display processor 128 comprises a Hypertext Transfer Protocol (HTTP) server that receives requests for information and responds by constructing and transmitting HTML pages. In one such embodiment, the HTTP server comprises a scaled-down version of the Apache Web server. In various embodiments, the functions described herein may be performed by various other components and devices.

Through the client devices 102a-n, users 112a-n can communicate over the network 106, with each other and with other systems and devices coupled to the network 106. As shown in FIG. 1, a server device 150 is also coupled to the network 106. In the embodiment shown, the search engine 122 can transmit a search query comprised of an explicit or implicit query or both to the server device 150. The user 112a can also enter a search query in a search engine interface, which can be transmitted to the server device 150. In another embodiment, the query signal may instead be sent to a proxy server (not shown), which then transmits the query signal to server device 150. Other configurations are also possible.

The server device 150 shown comprises a server executing a search engine application program, such as the Google™ search engine. Similar to the client devices 102a-n, the server device 150 shown comprises a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of or combination of computer processors, such as processors from Intel Corporation of Santa Clara, Calif. and Motorola Corporation of Schaumburg, Ill.

Memory 162 contains the search engine application program, also known as a search engine 170. The search engine 170 locates relevant information in response to a search query from a client device 102a. The search engine 122 then provides the result set to the client device 102a via the network 106. The result set comprises one or more article identifiers. An article identifier may be, for example, a URL, a file name, a link, an icon, a path for a local file, or anything else that identifies an article. In the embodiment shown, an article identifier comprises a URL associated with an article. The result set may comprise text, audio, video or any other type of content.

In the embodiment shown, the server device 150, or related device, has previously performed a crawl of the network 106 to locate articles, such as web pages, stored at other devices or systems connected to the network 106, and indexed the articles in memory 162 or on another data storage device. In other embodiments, a crawl is not performed. For example, in one embodiment, an index of articles is created manually.

It should be noted that embodiments of the present invention may comprise systems having different architecture than that which is shown in FIG. 1. For example, in some systems according to the present invention, server device 150 may comprise a single physical or logical server. The system 100 shown in FIG. 1 is merely exemplary, and is used to explain the exemplary methods shown in FIGS. 2 through 4.

Process

Various methods may be implemented in the environment shown in FIG. 1 and other environments, according to the present invention. Methods according to the present invention may be implemented by, for example, a processor-executable program code stored on a computer-readable medium.

In one embodiment of the present invention, a computer program identifies an article having an attribute, determines a category associated with the article based at least in part on the article attribute, and stores in a data store a data record comprising a category-article pair identifier associated with the category and the article. For example, a set of base categories may be stored on a client device. The base categories are based on registered schemas (e.g., a schema may exist for Email, Documents, Media, etc., which correspond to Email, Document, and Media categories) and on schema fields (e.g., for a Document Schema, ad "document type" field is stored that has a value of DOC, PDF, MPEG, etc.). A search query can be received and executed on a data store comprising the association data record. In response, the association data record can be received from the data store. The category-article pair identifier may comprise various attributes of an article, including, for example, an article identifier, name, file type, size, "author, and other attributes.

The data store may comprise disk, memory, or any other type of suitable storage. The attribute that the categorization is based on may be any type of suitable attribute, comprising, for example, a file type, an event schema, an event schema field, a location, a name, or other suitable attribute or any combination of suitable attributes.

In one embodiment, the capture processor 124, through the individual capture components, can monitor activity on the client device and can capture events by a generalized event definition mechanism, such as an event schema. Each capture component can define its own event schema or can use a predefined one. Event schema can differ depending on the client application or activity the capture component is monitoring. Generally, the event schema can describe the format for an event, such as, for example, by providing fields for event data associated with the event (such as the time of the event) and fields related to any associated article (such as the title) as well as the content of any associated article (such as the document body). An event schema can describe the format for any suitable event data that relates to an event. For example, an event schema for an instant messenger message event sent by the user 112a can include a recipient or list of recipients, the time sent, the date sent, content of the message, and a conversation ID. An event schema for a web page currently being viewed by a user can include the Uniform Resource Locator or URL of the web page, the time being viewed, and the content of the web page. An event schema for a word processing document being saved by a user can include the title of the document, the time saved, the location of the document, the format of the document, the text of the document, and a pointer to the location of the document. More generally, an event schema can describe the state of the system around the time of the event and also contain information describing other articles. For example, an event schema can contain a URL for a web page event associated with a previous web page that the user navigated from. In addition, event schema can describe fields with more complicated structure like lists. For example, an event schema can also contain lists of information. An email schema can contain fields that list such as, for example, multiple recipients from an email. An event schema can also contain optional fields so that an application can include additional event data if desired.

The article may be associated with none, one, or more than one category or action. The categories with which an article is associated with may be based on one or more attributes. For example, in one embodiment, a computer program attempts to associate an article with any categories that are relevant to one particular article attribute. In another embodiment, the computer program attempts to associate the article with multiple categories that are relevant to more than one attribute associated with the article. In yet another embodiment, the computer program attempts to associate the article with a category that is associated with an action, such as printing or emailing the article.

Similarly, a category may be associated with none, one, or more than one article. For example, in one embodiment of the present invention, a list of categories is created prior to assigning articles to the categories. In such an embodiment, a category may not be initially or ever associated with an article or may be associated with one or more articles.

In one embodiment of the present invention, an input signal is received. The input signal may comprise an event, and the event may comprise an article or part of an article or an identifier of an article. For example, in one such embodiment, a user executes an explicit query and then views an article that was provided as a result in a result set. The article comprises information about cars. When the user clicks on the link associated with the article, an event is generated and sent as a signal to an indexer or other computer program. The event comprises an identifier of the article and may comprise a snippet. The indexer uses the snippet to categorize the article associated with the article identifier. In this example, the article is associated with the category "Car."

In one embodiment, categories may be associated with both articles and other categories. In such an embodiment, a search may be performed among interrelationships of categories. The category/category relationships may suggest nested or hierarchical relationships among the categories or may just signal some other reason that the categories are related to one another.

For example, in one such embodiment of the present invention, the categories "Food" and "Mexican" are related based on a user's previous activity. The two categories may be related hierarchically—Mexican may be a type of Food. Conversely, Food may be a sub-category for a general category labeled "Mexican." The relationship may be captured in some way in the association data record. For example, the record may comprise a field to denote the hierarchical level of the two categories. In another embodiment, the two terms are related with no hierarchical relationship.

In one embodiment of the present invention, an article is associated with a category that is associated with an action. The action may comprise, for example, printing, faxing, emailing, copying, or some other suitable action. The category associated with the action may be, for example, "Printed," "Faxed," "Email-Sent," or "Copied." For example, the user creates a presentation and prints it. In response, one embodiment of the present invention creates two categories, "Presentation" and "Printed." Two corresponding association data records are also created linking the article with the categories.

After one or more association data records have been stored, a search engine or other application is able to perform searches based on categories. In one embodiment, the search engine receives a search query, causes the search query to be executed on the data store that comprises the association data records, and receives results from the data store that comprise an association between one or more categories and one or more article identifiers. In another embodiment, the search engine receives results that comprise associations between one or more categories and one or more other categories and performs a further search or further searches to locate article identifiers associated with the categories.

The search engine may generate a result set and may cause the article identifiers to be output. In one embodiment, the search engine generates an output signal that comprises the article identifier. For example, the search engine may generate an HTML page that comprises the article identifier, e.g., a short snippet, and a hyperlink to view the complete article. The output signal may comprise a plurality of article identifiers, and the identifiers may be sorted based at least in part on the categories.

The search engine or other application may also comprise the category in the output signal. In one such embodiment, the search engine generates an HTML page that comprises multiple article identifiers that are separated visually by category headers.

In another embodiment, a computer program receives a search query that comprises a category and at least one keyword. The search engine identifies the keyword and searches a data store for data associated with the keyword. For example, if a user enters the search query "Atlanta Mexican," the search engine identifies "Mexican" as a category and searches for association data records in which the article identifier is related to "Atlanta." In another embodiment, the search engine attempts to identify multiple categories in the search query. For example, if the user enters the search query "Atlanta Mexican Food," the search engine may identify "Mexican" and "Food" as categories and attempt to find association data records for these two categories. Once the records are found, the search engine may attempt to find articles related to one or both of the categories.

Figure 2:
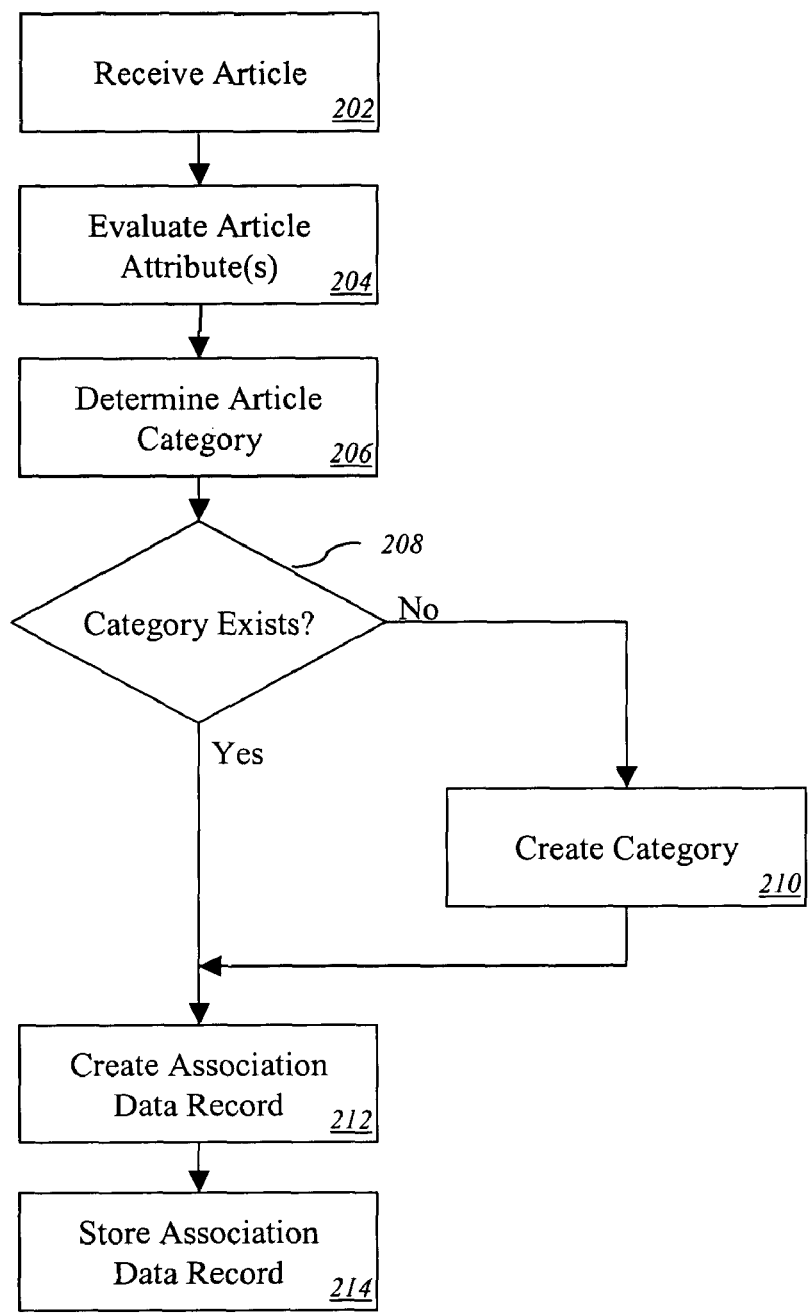
FIG. 2 is a flowchart illustrating a method for associating a category with an article in one embodiment of the present invention.

FIG. 2 is a flowchart illustrating a method for associating a category with an article in one embodiment of the present invention. In the embodiment shown, a computer program executing on the client 102a, such as capture processor 124 or the indexer 130, identifies an article 202. This identification may occur as a result of receiving the article, receiving data identifying the article (for example, a URL), or by other suitable means. In the embodiment shown in FIG. 2, the program receives an article 202. The article comprises a plurality of attributes, such as the name, file type, size, creation time, last access time, and author. The indexer 130 evaluates one or more of the attributes 204 to determine a category with which to associate the article 206.

For example, in one embodiment, an article is categorized by file type. The indexer 130 evaluates the file extension attribute of the article identified to determine the file type. For instance, the indexer 130 receives an article with a file type attribute equal to ".pdf." The indexer 130 searches a category-file type index, such as a table in a data store to determine one or more categories associated with the file type value. In the category-file type index, the ".pdf" extension may be categorized as a "PDF" or "Acrobat" article; a ".ppt" extension may be categorized as a "PowerPoint" and/or "Presentation" article.

In another embodiment, the name of a file is used to categorize the file. For example, a file that includes "2004 Budget" in the file name is categorized in both a "2004" category and a "Budget" category. In yet another embodiment, keywords are extracted from the content of an article. The indexer 130 then searches a category-keyword data store for one or more categories associated with the keyword. The article is then categorized based on the results of the search. For instance, the most relevant keywords may be used to construct a set of categories the document belongs to.

The search engine 122 may subsequently utilize the category to perform searches. The category may identify, for example, the article as having been created by an application, or the category may identify a subject matter of the article. The category may associate a person's name or the name of a place or organization with a particular article.

The indexer 130 may be unable to find a category with which to associated the article. For instance, the indexer 130 may not find a category match for the file type, name, keyword, or other attributes of the article. If the indexer 130 determines that no existing categories exist that can be associated with the article 208, the indexer 130 creates a new category and stores the category in a data store, such as a category data store, and an association with the article in a category-article data store.

In another embodiment, the indexer 130, after finding categories associated with the article and storing the category-article pair identifier for each category, attempts to infer whether or not a new category or set of categories need be created for the article.

The categories may be created in a number of ways. For example, in one embodiment, a user manually enters one or more categories. In another embodiment, the indexer 130 infers categories based on a user's past search patterns. For example, if a user uses a keyword frequently when performing searches, the indexer 130 may create a category for the keyword. If keywords are often submitted together, the indexer may infer relationships between the categories. In another embodiment, categories may be inferred from user behavior; for example, folders and directories on one or more computing devices mused by the user, categories created in various applications (e.g., folders of "Favorites" in a browser program, such as Microsoft Internet Explorer or email folders or labels in an email program, such as Microsoft Outlook), etc. may be identified and used to create categories. For example, if a user has created a folder or directory named "Taxes," then a category "Taxes" may be created, and articles stored in or otherwise associated with this folder may be tied to this category. Similarly, web documents indicated in a Favorites folder may be tied to a category name derived from the label of such folders.

For instance, a user enters a search query including the term "presentation." The query system 132 returns a result set including an article having a file type attribute value equal to "ppt." If the indexer 130 has not encountered an article having a ppt file type attribute, the indexer 130 can create a new category. The indexer 130 can infer the category based on the keyword in the search query, "presentation." Articles having a "ppt" file type may also be returned in response to a query comprising the term "PowerPoint." In such cases, the indexer 130 may create another category, "PowerPoint," and infer a relationship between the two categories, "presentation" and "PowerPoint."

Once the indexer 130 locates the appropriate category, or creates a new one, the indexer 130 creates an association data record 212. The association data record identifies both the category and the article and may comprise additional information as well. In one embodiment, the association data record comprises a category identifier and the uniform resource identifier (URI) for each category/article pair. The indexer 130 stores the association data record for later search and retrieval 214. In one embodiment, the association data record is stored in the data store 140.

One or more categories may be associated with any one article. And one or more articles may be associated with any one category. For instance, the user may interact with many PowerPoint documents. Each of the PowerPoint documents may be related to an additional category relating to content within the PowerPoint document. For instance, one PowerPoint may concern budgeting while another concerns targeted marketing. In such a scenario, each PowerPoint document would be associated with the "PowerPoint" category and a second topical category.

In one embodiment, for newly created categories, the indexer 140 inspects articles from categories related to the new category (e.g., parent category) and adds the qualifying articles to the newly created category.

The categories may also be associated with one or more other categories. For instance, in one embodiment, the categories are related in a hierarchical or nested structure such that broader categories are related to somewhat narrower categories, which are, in turn, related to narrower categories. In another embodiment, no nesting or hierarchical relationship between categories is implied; each category is directly associated with other categories. The category associations provide the search engine 122 with a method of retrieving articles of interest to a user.

Figure 3:
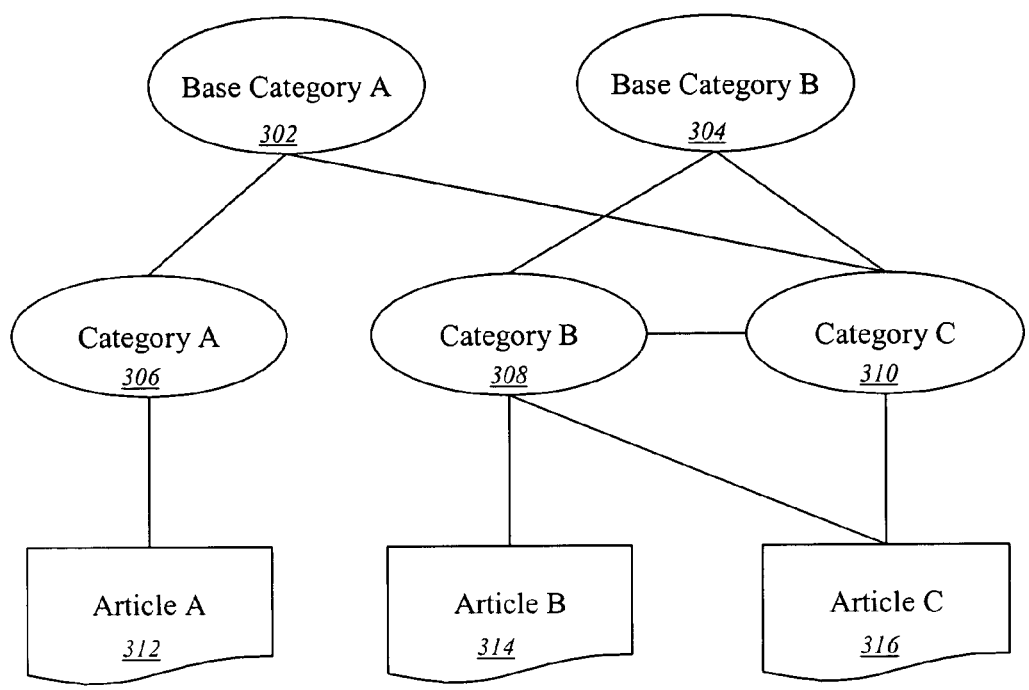
FIG. 3 is a block diagram illustrating relationships between categories and articles in one embodiment of the present invention.

FIG. 3 is a block diagram illustrating relationships between categories in one embodiment of the present invention. In the embodiment shown, two base categories have been created, Base Category A 302 and Base Category B 304. Base categories A and B are related to one or more categories, Category A 306, Category B 308, and Category C 310. Base categories and categories may be related to one another. For instance, in the embodiment shown in FIG. 3, Category B 308 and Category C 310 are related. The categories are in turn related to one or more articles. Category A 306 is related to Article A 312. Category B is related to Article B 314 and Article C 316. Category C 310 is related to Article C. A category may not be related to any other category or to any article. For example, if a user creates a category but does not perform a search, which causes an article to be associated with the category or never manually associates an article or category with the manually-created category, the category will simply exist with no relationships. Also, the three-level hierarchy shown in FIG. 3 is merely exemplary; an embodiment of the present invention may comprise any number of levels, and the number of levels between what is described as a base category and an article may vary from base category to base category, i.e., one base category may be related directly to an article while a second base category is related to one or more categories which are in turn related to one or more articles.

In the example described above in relation to FIG. 2, "Presentation" may be considered a base category, e.g., Base Category A 302. "PowerPoint" may be considered a category, e.g., Category A 306. An article having a file type equal to ".ppt" comprises an article, e.g., Article A 312.

Figure 4:
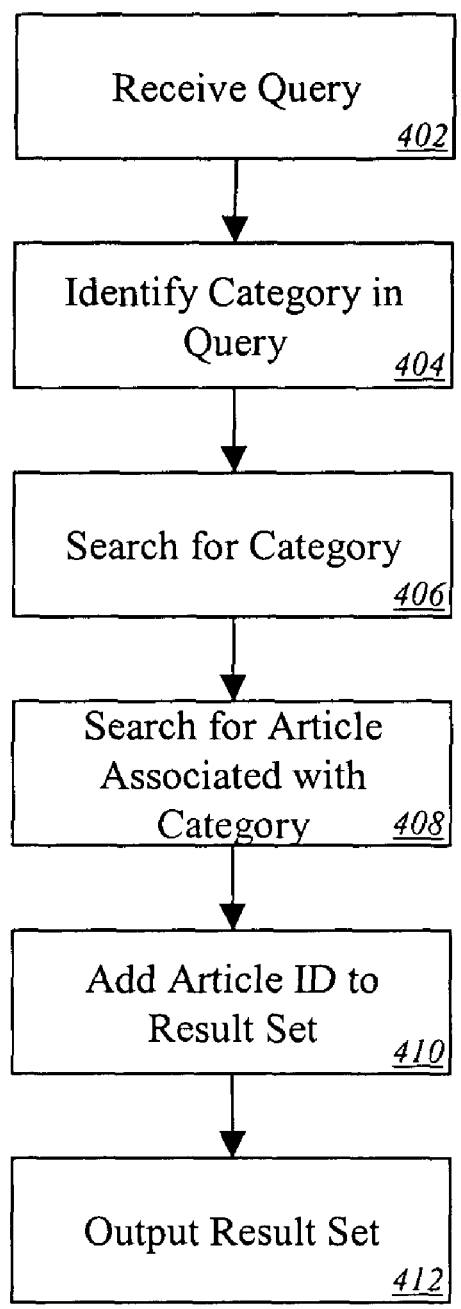
FIG. 4 is a flowchart illustrating a method for retrieving a result set using categories in one embodiment of the present invention.

After one or more categories have been created and articles associated with those categories, the categories can be used to perform searches. FIG. 4 is a flowchart illustrating a method for retrieving a result set using categories in one embodiment of the present invention. In the embodiment shown, a search engine application, such as the query system 132 of search engine 122, receives a search query 402. The search query comprises one or more keywords and may be an explicit or implicit query. The keywords may comprise a category or may comprise words that the query system 132 is able to categorize.

The query system 132 attempts to identify categories associated with the keywords 404. For instance, the query system 132 may receive a search query comprising the keywords "presentation 2003 budget." The query system searches a data store comprising categories for each of these three terms and may search a data store comprising category-keyword associations as well 406. The query system 132 identifies the term "presentation" as associated with the "PowerPoint" category. The query system 132 further identifies the keyword "budget" as associated with the "Budgeting" category. For example, the query system 132 may search a data store comprising category-keyword associations. Each query by keyword may return zero, one, or many categories.

The query system 132 then searches for articles associated with the category or categories 408. For instance, in the example above, the query system 132 performs a query of the data store for association data records having "PowerPoint" or "Budgeting" as the Category. The query system may then perform a union or intersection of the data sets to create a set of category/article association data records with which to work. In one embodiment, each association data record comprises an article identifier, such as a URI. In another embodiment, the association data record comprises a pointer to data store containing article identifiers. In a further embodiment, the association data record comprises both article and category identifiers associated with each category retrieved in response to the search query. In such an embodiment, the query system 132 performs additional queries for each set of category/category relationships until they are resolved into category/article relationships.

For example, in one embodiment, the term "Presentation" is a category. Associated with the category "Presentation" is the category "PowerPoint." A search query that the query system 132 determines is associated with "Presentation" may also be associated with "PowerPoint." Accordingly, articles associated with both the "PowerPoint" and "Presentation" categories would be returned or at least considered in response to the search query.

In the embodiment shown in FIG. 4, the query system 132 adds an article identifier to a result set for each article that the query system 132 identifies as related to a relevant category 410. In other embodiments, the query system 132 may filter or otherwise limit the results so that not every article is added. The category search 406, article search 408, and article identifier addition to the result set 410 may be repeated until a pre-determined number of results has been found, until no additional results can be found, or according to some other condition. Once the query system 132 has built the result set, the result set is output 412. For example, the query system 132 may generate a result set comprising 20 relevant articles, based on the category search, and cause those 20 articles to be displayed to the user. The results may be presented separately or in conjunction with the results from other searches or types of searches.

Example

Figure 5:
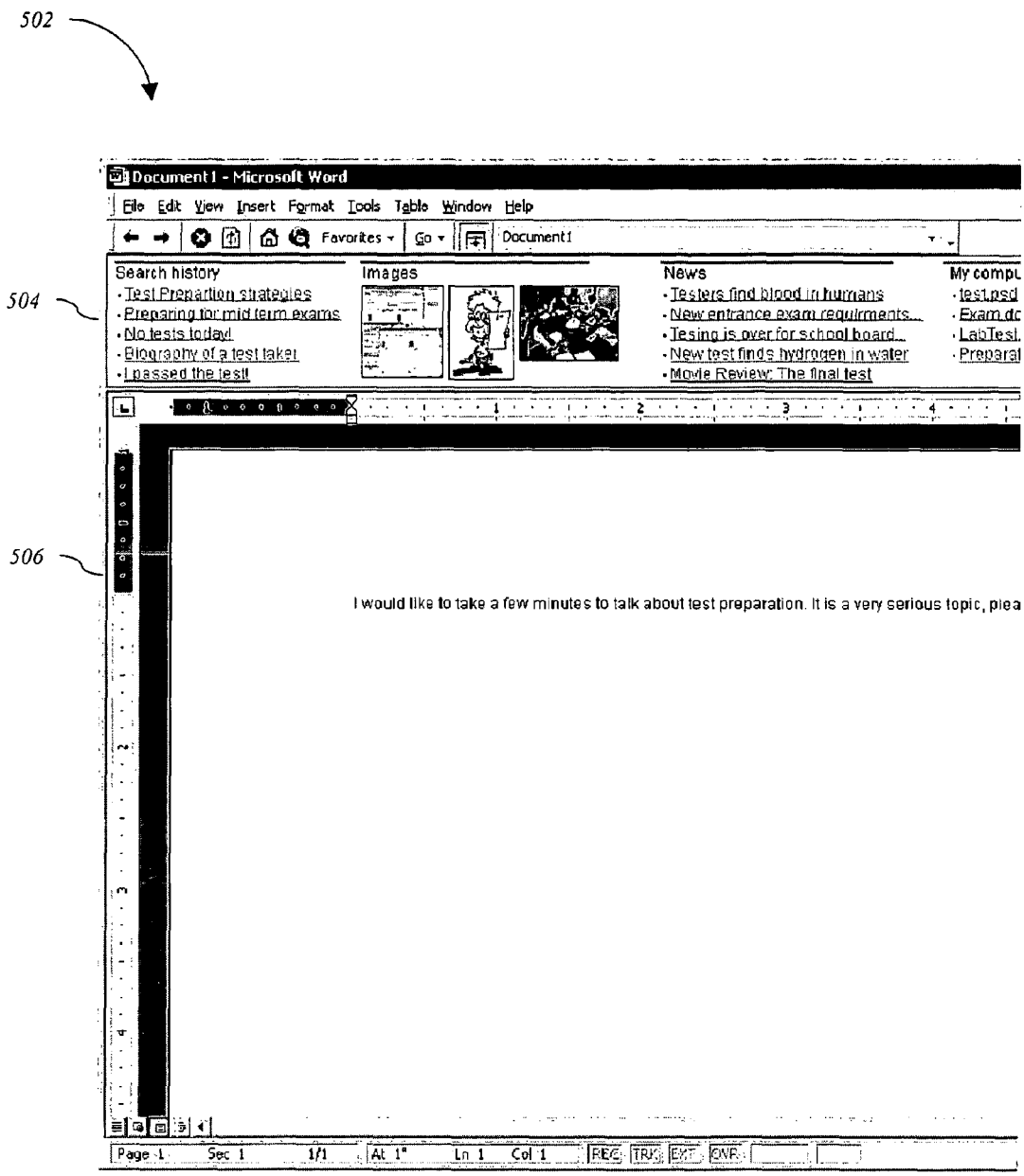
FIG. 5 is a screenshot illustrating a user interface supporting category-based searches in one embodiment of the present invention.

FIG. 5 is a screenshot illustrating a user interface supporting category-based searches in one embodiment of the present invention. In the embodiment shown, the user has previously searched for, created, modified, or otherwise performed tasks that have caused the indexer 130 to create associations between categories and articles. The user then begins entering text in a word processing user interface 502. The word processing interface shown comprises various sections, comprising a section for displaying search results 504 and a section for entering and editing text 506. In other embodiments, these sections may be separate from the application interface.

In the embodiment shown, the user enters text in the text entry section 506 of the application that comprises the terms "test" and "preparation." In response to the user completing the sentence, i.e., entering a period, the application shown generates an implicit query that comprises all of the terms from the first sentence, comprising the terms "test" and "preparation." In response, the query system 132 identifies a category called "Test Preparation." Associated with the category are various articles identifiers.

The user then emails the article as an attachment to another user. When the user emails the article, an event is generated. The event is captured, and a new category is created—"Email-Sent." In response to the user emailing the article, e.g., pressing the send key, the application generates an implicit query. In response, the query system 132 identifies the category "Email-Sent" as well as the category "Test Preparation." Associated with both of these categories are various article identifiers.

The query system 132 uses the article identifiers to find and/or generate brief snippets about the articles and displays those snippets in the search results section 504 of the application interface 502. In the embodiment shown, the results comprise previously retrieved search results, images, news, and information from the user's computer. In other embodiments both subsets of this information and/or additional information may be shown depending on the user's preferences and other criteria.

GENERAL

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A computer-implemented method for category-based search, the method executed by one or more computer systems and comprising:

identifying an event comprising a user interaction with an article stored on a storage device of a client device responsive to monitoring user interactions with the client device;

identifying an event schema describing a format of the identified event responsive at least in part to an article type of the article, the schema comprising fields based on the article type and fields that describe interactions with the article;

identifying a plurality of attributes associated with the identified event that correspond to the fields based on the article type and fields that describe interactions with the article, the plurality of attributes identified responsive to the article and the monitored user interactions;

determining at least a first category associated with the article based at least in part on the attributes;

storing at least a first association data record, the association data record comprising a category-article pair identifier associating the first category and an article identifier identifying the article;

receiving an implicit search query;

causing the implicit search query to be executed on a data store comprising the first association data record; and receiving the first association data record from the data store.

2. The method of claim 1, wherein the client device comprises a web server.

3. The method of claim 1, further comprising determining a second category associated with the article based at least in part on the attributes.

4. The method of claim 1, further comprising:

determining that the first category is associated with a second article based at least in part on the attributes; and storing a second association data record, the second association data record comprising a second category-article pair identifier associating the first category and an article identifier identifying the second article.

5. The method of claim 1, wherein determining at least a first category associated with the article further comprises creating the category.

6. The method of claim 1, wherein receiving the association data record further comprises generating an output signal.

7. The method of claim 6, wherein the output signal comprises the article identifier.

8. The method of claim 6, wherein the output signal further comprises the first category.

9. The method of claim 8, further comprising causing the output of the first category and the article identifier.

10. The method of claim 6, wherein the output signal comprises a plurality of article identifiers.

11. The method of claim 10, further comprising sorting the plurality of article identifiers based at least in part on the first category.

12. The method of claim 1, wherein identifying the event schema for the identified event responsive at least in part to an article type of the article comprises:

selecting the event schema for the event from among a plurality of schemas associated with a plurality of article types.

13. The method of claim 1, wherein the article type is one or more of: a word processing document, a spreadsheet, an audio file, a video file, a database, a client-application program, a web page, a electronic mail message and an instant messenger message.

14. The method of claim 1, wherein the fields that describe the interaction with the article comprise one or more fields corresponding to a time associated with the interaction with the article.

15. The method of claim 1, wherein the interaction with the article comprises one or more of: printing the article, emailing the article, sending the article, viewing the article, selecting a link associated with the article, faxing the article and copying the article.

16. The method of claim 15, determining at least a first category associated with the article based at least in part on the attributes comprises determining a first category representing the interaction with the article.

17. The method of claim 1, wherein the event schema is identified responsive at least in part to the monitored user interactions.

18. A computer-implemented method for category-based search, the method executed by one or more computer systems and comprising:

identifying an event comprising a user interaction with an article stored on a storage device of a client device responsive to monitoring user interactions with the client device;

identifying an event schema describing a format of the identified event responsive at least in part to an article type of the article, the schema comprising fields based on the article type and fields that describe interactions with the article;

identifying a plurality of attributes associated with the identified event that correspond to the fields based on the article type and fields that describe interactions with the article, the plurality of attributes identified responsive to the article and the monitored user interactions;

automatically creating at least a first category associated with the article based at least in part on the plurality of attributes;

storing an association data record, the association data record comprising a category-article pair identifier associating the first category and an article identifier identifying the article;

receiving an implicit search query;

causing the implicit search query to be executed on a data store comprising the association data record; and receiving the association data record from the data store.

19. The method of claim 18, further comprising:

determining a second category related to the first category; and for each association data record comprising a category-article pair identifier associating the first category and an article identifier identifying with the article, storing a second association data record associating the second category and the article identifier identifying the article.

20. The method of claim 18, wherein identifying the event schema for the identified event responsive at least in part to an article type of the article comprises:

selecting the event schema for the event from among a plurality of schemas associated with a plurality of article types.

21. A computer-implemented method for category-based search, the method executed by one or more computer systems and comprising:

identifying an event comprising a user interaction with an article stored on a storage device of a client device responsive to monitoring user interactions with the client device;

identifying an event schema describing a format of the identified event responsive at least in part to an article type of the article, the schema comprising fields based on the article type and fields that describe interactions with the article;

creating a category associated with the article based at least in part on the fields that describe interactions with the article;

storing an association data record, the association data record comprising a category-article pair identifier associating the category and an article identifier identifying the article;

receiving an implicit search query;

causing the implicit search query to be executed on a data store comprising the association data record; and receiving the association data record from the data store.

22. The method of claim 21, wherein the category comprises a first category and further comprising:
   determining a second category related to the first category; and
   for each association data record associating the first category and the article identifier identifying the article, storing a second association data record associating the second category and the article identifier.

23. The method of claim 21, wherein the category comprises a first category, the association data record comprises a first association data record, the article comprises an article attribute, further comprising:
   determining a second category associated with the article based at least in part on the article attribute; and
   storing a second association data record, the second association data record comprising a category-article pair identifier associating the second category and the article identifier identifying the article.

24. A computer-implemented method for category based search, the method executed by one or more computer systems and comprising:
   identifying an event comprising a user interaction with a web page responsive to monitoring user interactions with a client device;
   identifying an event schema describing a format of the identified event, the schema comprising fields describing the web page and fields that describe interactions with the web page;
   identifying a plurality of attributes associated with the identified event based at least in part on one or more fields of the event schema, the plurality of attributes identified responsive to the web page and the monitored user interactions, wherein at least a first attribute is associated with a keyword;
   searching a category-keyword data store for a category associated with the keyword;
   receiving a category identifier from the category-keyword data store;
   storing an association data record in a category-article data store, the association data record comprising a category-article pair identifier, the category-article pair identifier associating the category identifier and an identifier identifying the web page;
   receiving an implicit search query;
   causing the implicit search query to be executed on the category-article data store;
   receiving the association data record from the category-article data store; and
   causing the identifier identifying the web page and the category to be output.

25. A non-transitory computer-readable storage medium on which is encoded executable program code for category-based search, the program code comprising:
   program code for identifying an event comprising a user interaction with an article stored on a storage device of a client device responsive to monitoring user interactions with the client device;
   program code for identifying an event schema describing a format of the identified event responsive at least in part to an article type of the article, the schema comprising fields based on the article type and fields that describe interactions with the article;
   program code for identifying a plurality of attributes associated with the identified event that correspond to the fields based on the article type and fields that describe interactions with the article, the plurality of attributes identified responsive to the article and the monitored user interactions;
   program code for determining at least a first category associated with the article based at least in part on the attributes;
   program code for storing at least a first association data record, the association data record comprising a category-article pair identifier associating the first category and an article identifier identifying the article;
   program code for receiving an implicit search query;
   program code for causing the implicit search query to be executed on a data store comprising the first association data record; and
   program code for receiving the first association data record from the data store.

26. The computer-readable storage medium of claim 25, further comprising program code for determining a second category associated with the article based at least in part on the attributes.

27. The computer-readable storage medium of claim 25, further comprising:
   program code for determining that the first category is associated with a second article based at least in part on the attributes; and
   program code for storing a second association data record, the second association data record comprising a second category-article pair identifier associating the first category and an article identifier identifying the second article.

28. The computer-readable storage medium of claim 25, further comprising program code for storing a second association data record, the second association data record comprising the first category and a second category.

29. The computer-readable storage medium of claim 25, wherein program code for determining at least a first category associated with the article further comprises program code for creating the category.

30. The computer-readable storage medium of claim 25, wherein receiving the association data record further comprises program code for generating an output signal.

31. The computer-readable storage medium of claim 30, wherein the output signal further comprises the first category.

32. The computer-readable storage medium of claim 31, further comprising program code for causing the output of the first category and the article identifier.

33. The computer-readable storage medium of claim 30, wherein the output signal comprises a plurality of article identifiers.

34. The computer-readable storage medium of claim 33, further comprising sorting the plurality of article identifiers based at least in part on the first category.

35. The computer-readable storage medium of claim 25, wherein program code for identifying the event schema for the identified event responsive at least in part to an article type of the article comprises program code for:
   selecting the event schema for the event from among a plurality of schemas associated with a plurality of article types.

36. A non-transitory computer-readable storage medium on which is encoded executable program code for category-based search, the program code comprising:
   program code for identifying an event comprising a user interaction with an article stored on a storage device of a client device responsive to monitoring user interactions with the client device;

program code for identifying an event schema describing a format of the identified event responsive at least in part to an article type of the article, the schema comprising fields based on the article type and fields that describe interactions with the article;

program code for identifying a plurality of attributes associated with the identified event that correspond to the fields based on the article type and fields that describe interactions with the article, the plurality of attributes identified responsive to the article and the monitored user interactions;

program code for automatically creating at least a first category associated with the article based at least in part on the attributes;

program code for storing an association data record, the association data record comprising a category-article pair identifier associating the first category and an article identifier identifying the article;

program code for receiving an implicit search query;

program code for causing the implicit search query to be executed on a data store comprising the association data record; and program code for receiving the association data record from the data store.

37. The computer-readable storage medium of claim 36, further comprising:

program code for determining a second category related to the first category; and for each association data record associating the first category and the article identifier identifying the article, program code for storing a second association data record associating the second category and the article identifier identifying the article.

38. The computer-readable storage medium of claim 36, wherein program code for identifying the event schema for the identified event responsive at least in part to an article type of the article comprises program code for:

selecting the event schema for the event from among a plurality of schemas associated with a plurality of article types.

39. A non-transitory computer-readable storage medium on which is encoded executable program code for category-based search, the program code comprising:

program code for identifying an event comprising a user interaction with an article stored on a storage device of a client device responsive to monitoring user interactions with the client device;

program code for identifying an event schema describing a format of the identified event responsive at least in part to an article type of the article, the schema comprising fields based on the article type and fields that describe interactions with the article;

program code for creating a category associated with the article based at least in part on the fields that describe interactions with the article;

program code for storing an association data record, the association data record comprising a category-article pair identifier associating the category and an article identifier identifying the article;

program code for receiving an implicit search query;

program code for causing the implicit search query to be executed on a data store comprising the association data record; and program code for receiving the association data record from the data store.

40. The computer-readable storage medium of claim 39, wherein the category comprises a first category and further comprising:

program code for determining a second category related to the first category; and for each association data record associating the first category and the article identifier identifying the article, program code for storing a second association data record associating the second category and the article identifier identifying the article.

41. The computer-readable storage medium of claim 39, wherein the category comprises a first category, the association data record comprises a first association data record and the article comprises an article attribute, further comprising:

program code for determining a second category associated with the article based at least in part on the article attribute; and program code for storing a second association data record, the second association data record comprising a category-article pair identifier associating the second category and the article identifier identifying the article.

42. A computer readable storage medium on which is encoded executable program code for category based search, the program code comprising:

program code for identifying an event comprising a user interaction with a web page responsive to monitoring user interactions with a client device;

program code for identifying an event schema describing a format of the identified event responsive at least in part to an article type of the web page, the schema comprising fields describing the web page and fields that describe interactions with the web page;

program code for identifying a plurality of attributes associated with the identified event based at least in part on one or more fields of the event schema, the plurality of attributes identified responsive to the web page and the monitored user interactions, wherein at least a first attribute is associated with a keyword;

program code for searching a category-keyword data store for a category associated with the keyword;

program code for receiving a category identifier from the category-keyword data store;

program code for storing an association data record in a category-article data store, the association data record comprising a category-article pair identifier, the category-article pair identifier associating the category identifier and an identifier identifying the web page;

program code for receiving an implicit search query;

program code for causing the implicit search query to be executed on the category-article data store;

program code for receiving the association data record from the category-article data store; and program code for causing the identifier identifying the web page and the category to be output.

43. The computer-readable storage medium of claim 42, wherein program code for identifying the event schema for the identified event responsive at least in part to an article type of the article comprises program code for:

selecting the event schema for the event from among a plurality of schemas associated with a plurality of article types.

* * * * *